United States Patent [19]
Wait

[11] Patent Number: 5,538,088
[45] Date of Patent: Jul. 23, 1996

[54] COMBINE HEADER ADAPTOR FOR A THREE-POINT HITCH

[76] Inventor: Ernest H. Wait, 15631 Road G, Campo, Colo. 81029

[21] Appl. No.: 341,356

[22] Filed: Nov. 17, 1994

[51] Int. Cl.[6] .............................................. A01B 59/043
[52] U.S. Cl. ...................... 172/439; 280/416.2; 414/703
[58] Field of Search .................... 172/439, 450, 172/272, 273, 605; 280/455.1, 474, 402, 416.2; 180/14.4; 414/703; 56/15.1, 15.2, 15.6, DIG. 14

[56] References Cited

U.S. PATENT DOCUMENTS

| | | | |
|---|---|---|---|
| 3,542,399 | 11/1970 | Myers | 280/416.2 X |
| 3,829,128 | 8/1974 | Sutton et al. | 280/461 A |
| 4,019,753 | 4/1977 | Kestel | 280/416.2 X |
| 4,116,283 | 9/1978 | Blessent | 172/439 X |
| 4,214,636 | 7/1980 | Griffith | 172/450 |
| 4,214,776 | 7/1980 | Nurse | 280/416.2 X |
| 4,805,927 | 2/1989 | Stephenson et al. | 172/47 |
| 4,850,789 | 7/1989 | Zimmerman | 172/272 X |
| 5,026,247 | 6/1991 | Zimmerman | 172/272 X |
| 5,029,650 | 7/1991 | Smit | 172/439 X |
| 5,169,279 | 12/1992 | Zimmerman | 172/439 X |
| 5,267,747 | 12/1993 | Thorn | 280/416.2 |
| 5,303,790 | 4/1994 | Coleman | 180/14.4 X |

*Primary Examiner*—Terry Lee Melius
*Assistant Examiner*—Victor Batson
*Attorney, Agent, or Firm*—David L. Baker; Rhodes & Ascolillo

[57] ABSTRACT

An adapter for the three point hitch on an agricultural tractor for lifting and transporting the header of a combine harvesting machine comprising a frame with appropriately positioned hitch pins for engaging the three point hitch and an upper frame member adapted to engage the feed opening in the combine header housing and a pair of bumpers on a lower frame member to stabilize the header when it is lifted or transported.

1 Claim, 3 Drawing Sheets

COMBINE HEADER ADAPTOR FOR A THREE-POINT HITCH

BACKGROUND OF THE INVENTION

1. Field of the Invention

The invention relates generally to adapters for use with agricultural tractors and more particularly to a three point hitch adaptor for use with combine header equipment.

2. Description of the Prior Art

Agricultural tractors are routinely equipped with a so called three-point hitch which allows the operator to raise and lower as well as pull farm implements. The typical hitch is powered by the tractor's hydraulic system and is controlled by a lever in the operator's compartment. Mounted on the rear of the tractor and having sufficient power to lift heavy objects, the three-point hitch has been subject to various adaptations that add to its versatility.

In U.S. Pat. No. 4,214,636 issued Jul. 29, 1980 to Griffith, a three-point hitch adapter is shown which will assist when a farm tractor turns a sharp corner while the implement, attached to the three-point hitch, remains on the ground. A hitch adapter which is used in connecting semi-integral, pto-driven implements to a tractor's three-point hitch is disclosed in U.S. Pat. No. 4,805,927 issued Feb. 21, 1989 to Stephenson et al. Smit discloses an adjustable quick attaching hitch coupler in U.S. Pat. No. 5,029,650 issued Jul. 9, 1991. Another adaptor for a three point hitch is shown in the U.S. Pat. No. 5,267,747 issued Dec. 7, 1993 to Thorn. An early model quick hitch adapter that can be adjusted from category 2 to category 3 without disconnecting the adapter from the tractor is shown in U.S. Pat. No. 3,829,128 issued Aug. 13, 1974 to Sutton et al.

In areas of the Mid-West, the harvesting combine may work miles from the nearest maintenance or repair shop. While some repairs may be made on-site, other repairs are best performed in a shop equipped for the task. Likewise not all shops have the space to handle the entire combine and it must be dismantled and taken into the shop in sections or pieces to be worked on. A major component of the combine is the header unit which consists of the sickle bar, paddles and the associated housing. The header may be twenty five to thirty feet in length and weigh tons. The header is normally moved by the combine but if conditions exist where the combine is inoperative or cannot maneuver to deposit the header in the shop the task then becomes time consuming and arduous using what ever tools and equipment are available.

SUMMARY OF THE INVENTION

The invention is directed to an adapter for the three point hitch of an agricultural tractor that will lift and transport the header component of the combine harvesting machine. The adapter is a frame formed to enter the feed tube aperture in the header housing and engage the uppermost edge of the aperture. A pair of spaced bumpers are mounted on a lower frame member and abut the lower region of the header housing. Since the three-point hitch lifts vertically the top frame member is extended out and away from the upright frame member that includes the upper hitch pin. The lower hitch pins extend from the lower horizontal frame member. The adapter would function with the hitch coupler disclosed in the patent to Smit, discussed above.

It is therefore an object of the invention to provide a new and improved combine head adapter for a three point hitch that is simple to operate and easily installed.

It is another object of the invention to provide a new and improved combine head adapter for a three-point hitch that will lift and transport the combine head without the need for special tools or equipment.

It is a further object of the invention to provide a new and improved combine head adapter for a three-point tractor hitch which is of a durable and reliable construction.

It is still another object of the invention to provide a new and improved combine head adapter for a three-point hitch which may be easily and efficiently manufactured and marketed.

It is still a further object of the invention to provide a new and improved combine head adapter for a three-point hitch that is capable of low cost of manufacture with regard to both materials and labor and accordingly capable of low prices of sale to the consuming public.

It is another object of the invention to provide a new and improved combine head adapter for a three-point hitch that is safe to use.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
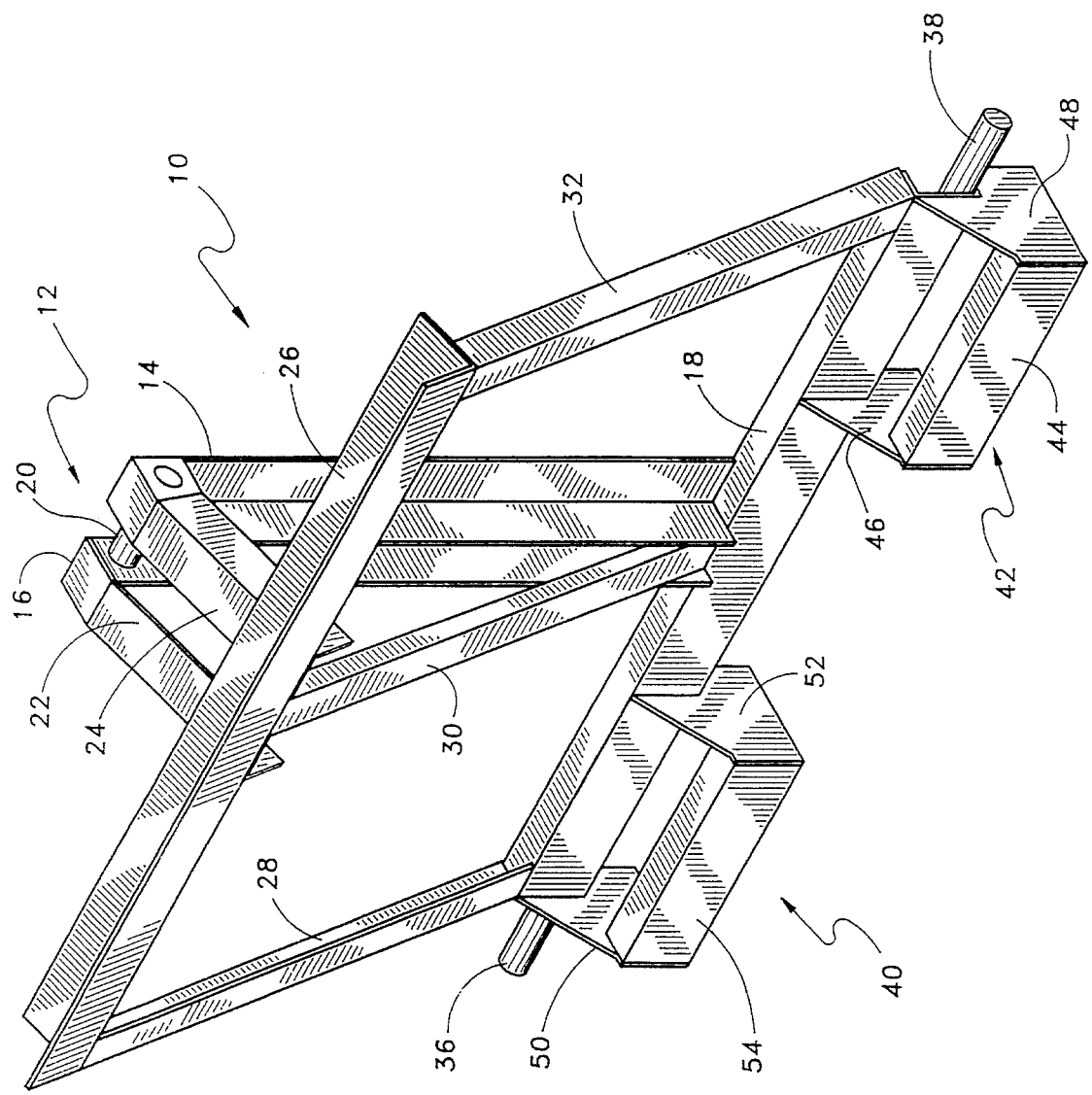
FIG. 1 is a perspective view of the adapter of the invention.

Referring now to FIG. 1, the header adapter is shown generally at 10. The vertical lift member is shown generally at 12 and is formed of two parallel spaced lengths of right angle iron 14 and 16. The vertical lift members are affixed, as by welding, at one end to the lower horizontal frame member 18 formed of channel iron of appropriate size. The upper most ends of the vertical members are connected by the lift pin 20. Extension links 22,24 connect the vertical lift members 14,16 to the upper horizontal frame member 26 which is a right angle iron adapted to engage the upper edge of the feed tube aperture in the combine header housing. Upright members 28,30 and 32 complete the frame and extend from the lower horizontal member 18 to the upper horizontal member 26. Members 28 and 32 are formed of right angle iron while member 30 is formed of channel iron and is positioned between the vertical lift members 14,16 on one end and links 22,24 at the other end. Lower lift pins 36 and 38 extend from the channel 18 in the lower horizontal frame member.

Bumpers shown generally at 40,42 are provided to engage the lower area of the header housing. Gussets 46,48 are affixed by welding to the lower horizontal frame member 18. The bumper face 44 is formed of a channel iron affixed as by welding to the gussets. Bumper 40 is also formed by gussets 50, 52 and bumper face 54.

Figure 2:
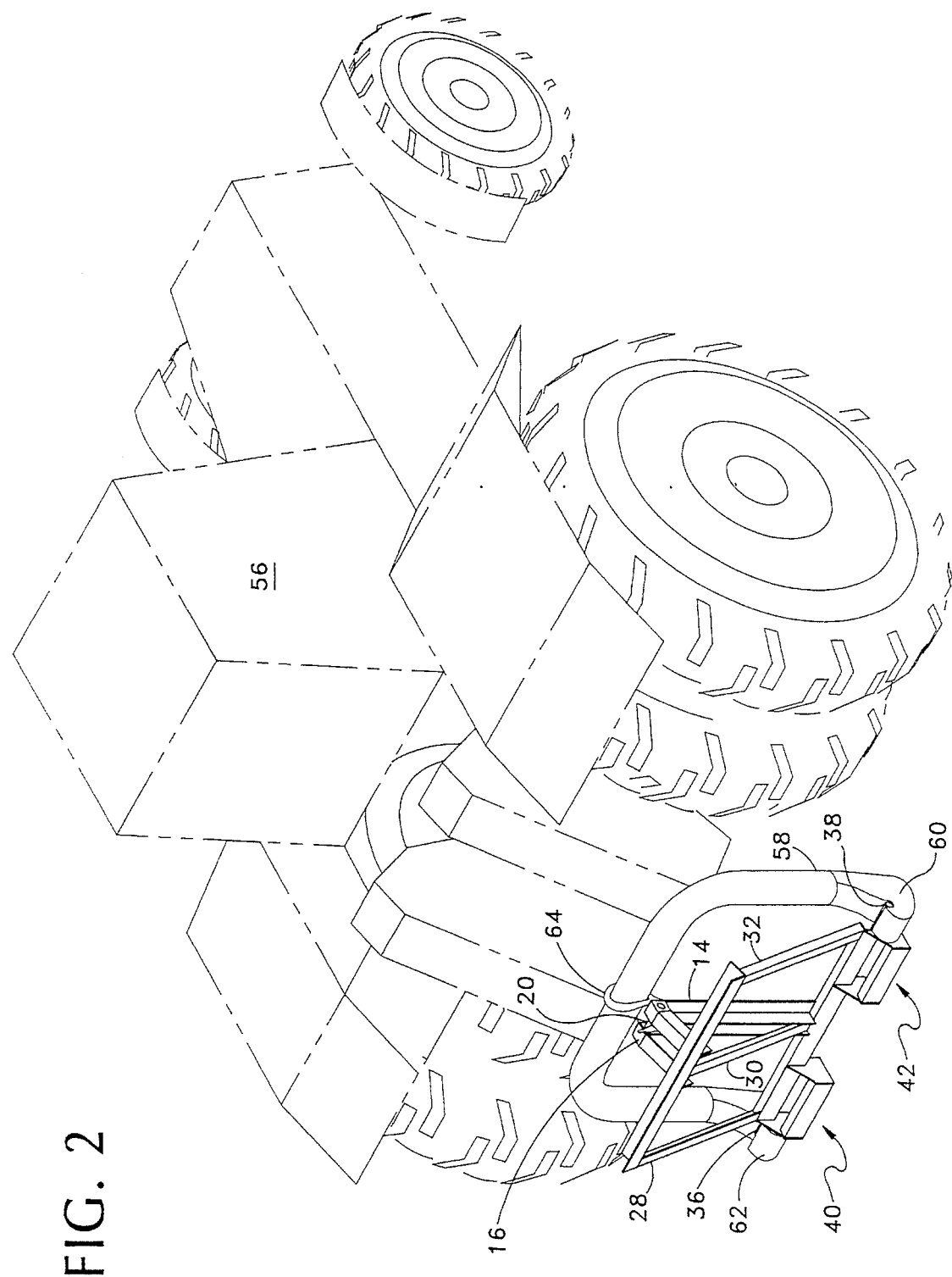
FIG. 2 is an environmental view of the invention.

Concerning FIG. 2, an agricultural tractor is shown at 56 with a three-point hitch including a frame 58 with lower hook members 60,62 having upper recessed surfaces for receiving lower lift pins 36,38. Upper hook member 64 connects the upper lift pin 20 to the hitch frame 58. The hitch frame is connected to the tractor and activated by a hydraulic ram or rams operated by the tractor's hydraulic system.

Figure 3:
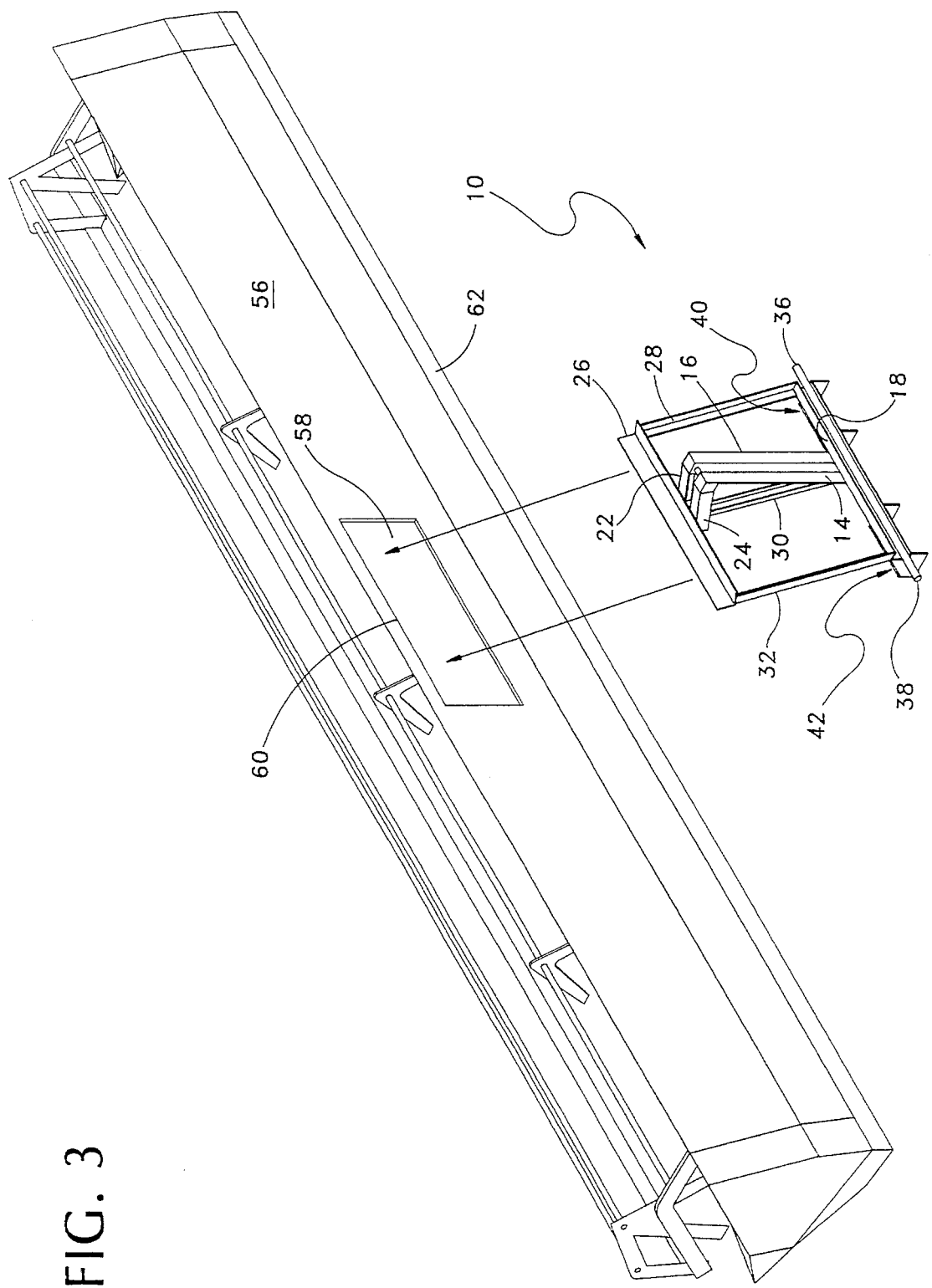
FIG. 3 is a perspective view of the invention with the combine header.

FIG. 3 shows the combine header adapter generally at 10 positioned to engage the combine header 56. The housing of the header adapter contains an aperture 58 for connection to a feed tube (not shown) which accepts and directs the cuttings of the sickle bar into the truck or wagon following the combine. The angle iron 26 which forms the top horizontal member of the frame is sized and designed to engage the uppermost edge 60 of the aperture 58. The top horizontal member is extended by links 22,24 beyond the lower horizontal member 18 and the bumpers shown generally at 40,42 to compensate for the arcuate shape of the housing. The result is that the bumpers engage the lower surface member 62 of the header housing coincidentally with the engagement of the upper horizontal member allowing the header to be engaged and disengaged by the adapter in a manner that will evenly distribute the forces and increase the safety factor in raising and transporting the header.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A combine header adapter, to lift a combine header, for a three point agricultural tractor hitch comprising:

a frame means;

a lower horizontal frame member connected to said frame means;

an upper horizontal frame member connected to said frame means;

a header engagement member on the upper horizontal frame member;

the header engagement member adapted to engage a combine header feeding tube aperture;

means associated with the frame for engagement with a three point hitch;

said means associated with the frame for engagement with a three point hitch comprising hitch pins;

a pair of vertical lifting members connected to the lower horizontal frame member;

a pair of links connected to the pair of vertical lifting members and extending in a direction substantially transverse to a primary axis of said vertical lifting members;

three vertical frame members connected to and between the lower horizontal frame member and the upper horizontal frame member;

bumper means, connected to the lower horizontal frame means, for engaging and stabilizing the header housing upon engagement of the upper frame member;

the vertical lift members are connected at an end opposed to the lower horizontal frame member by an upper hitch pin;

the upper horizontal frame member is formed of a 90 degree steel angle iron;

said three vertical frame members are spaced equidistant across the upper and lower horizontal frame members;

a central vertical frame member of said three vertical frame members is affixed between the vertical lift members at the lower horizontal member and between said links at the upper horizontal frame member; and the bumper means are positioned at and affixed to, opposite ends of the lower horizontal frame member.

\* \* \* \* \*